United States Patent [19]
Fajeau et al.

[11] Patent Number: 4,759,903
[45] Date of Patent: Jul. 26, 1988

[54] APPARATUS FOR AUTOMATICALLY STARTING THE DROP OF AN ABSORBING MEMBER INTO A NUCLEAR REACTOR CORE

[75] Inventors: Maurice Fajeau, Pertuis; Alain Debard, Neauphle le Chateau; Jean-François Guillot, Aix en Provence, all of France

[73] Assignee: Commissariat a l'Energie Atomique, Paris, France

[21] Appl. No.: 932,631

[22] Filed: Nov. 20, 1986

[30] Foreign Application Priority Data

Nov. 28, 1985 [FR] France ................................ 85 17594

[51] Int. Cl.⁴ .................................................. G21C 7/12
[52] U.S. Cl. ..................... 376/336; 376/233; 403/32; 403/31; 294/906; 294/86.15; 294/93
[58] Field of Search ............... 376/336, 337, 233; 294/906, 82.28, 86.15, 86.18, 93, 86.24; 403/32, 31, 15

[56] References Cited

U.S. PATENT DOCUMENTS

| | | | |
|---|---|---|---|
| 3,609,825 | 10/1971 | Pullos | 294/82.28 |
| 3,733,251 | 5/1973 | Gilbertson et al. | 376/233 |
| 3,782,838 | 1/1974 | Tiraspolsky et al. | 403/32 |
| 4,167,443 | 9/1979 | Noyes et al. | 376/233 |
| 4,411,857 | 10/1983 | Sridhar | 376/233 |

FOREIGN PATENT DOCUMENTS

| | | | |
|---|---|---|---|
| 235874 | 3/1960 | Australia | 376/336 |
| 763039 | 7/1967 | Canada | 376/336 |
| 1922426 | 11/1970 | Fed. Rep. of Germany | |
| 1277379 | 10/1961 | France | |
| 2025050 | 9/1970 | France | |
| 890572 | 3/1962 | United Kingdom | 376/336 |
| 908059 | 10/1962 | United Kingdom | 376/233 |

Primary Examiner—Harvey E. Behrend
Attorney, Agent, or Firm—Kerkam, Stowell, Kondracki & Clarke

[57] ABSTRACT

In order to automatically initiate without any intermediate instrumentation chain the drop of absorbing members into the core of a nuclear reactor, in the of a drop in the cooling liquid level to below a given threshold and, optionally, a rise in the pressure to beyond a maximum permitted value, between each absorbing member and the bar supporting said member is provided an apparatus, which comprises tongs formed by at least two fingers, said tongs normally being locked in a gripping position by locking members, such as balls. A float mounted in the bar controls the unlocking of the tongs in either of the two conditions requiring the dropping of the absorbing members.

12 Claims, 8 Drawing Sheets

APPARATUS FOR AUTOMATICALLY STARTING THE DROP OF AN ABSORBING MEMBER INTO A NUCLEAR REACTOR CORE

BACKGROUND OF THE INVENTION

The present invention relates to an apparatus for automatically initiating the drop of a neutron absorbing member into the core of a nuclear reactor.

More specifically, the apparatus according to the invention makes it possible to automatically free from its control mechanism an absorbing member, when the level of the cooling liquid circulating in the vessel containing the reactor core drops below a minimum level.

In nuclear reactors, scram of the fission reaction in the reactor core is obtained by dropping neutron absorbing members into the latter.

In pressurized water nuclear reactors, these absorbing members are generally in the form of a cluster or a control rod. They are suspended on a control bar, which is itself connected to a manipulating member by an electromagnetic link. By controlling the fracture of this link, the absorbing members automatically drop into the reactor core and consequently bring about the scram of the fission reaction. Experience has shown that these scramming systems have a very high reliability level.

However, the information controlling scram passes through a complex electronic and mechanical apparatus chain and consequently it is not impossible for none of the absorbing members to drop into the reactor core.

Despite the highly improbable character of this hypothesis, it still leads to considering the existence of a scram system making it possible, by a direct mechanical action to automatically separate the absorbing member from its control bar when the cooling conditions impose reactor scram.

SUMMARY OF THE INVENTION

The present invention relates to an apparatus making it possible to automatically initiate the dropping of the absorbing members into the reactor core in the case of a significant drop in the cooling liquid level in the reactor vessel as a result of a leak in its primary circuit.

In its most general definition making it possible to achieve this objective, the invention relates to an apparatus for automatically initiating the drop of a neutron absorbing element into the core of a nuclear reactor, when the level of a cooling liquid circulating in a vessel containing the reactor core drops below a given minimum level, the absorbing member normally being suspended on a support member, wherein the apparatus comprises a gripper or tongs with at least two fingers, mounted on the supporting member and by which the absorbing member is suspended on the supporting member, said tongs being able to occupy a closed position and an open position; and at least one float associated with the supporting member, so as to be able to move vertically between a raised position and a lowered position, said float controlling the locking of the tongs in the closed position when it is in the raised position and allowing the opening of the tongs when it is in the lowered position.

As a result of these characteristics, the absorbing member is normally suspended on the tongs carried by the control bar, in such a way that the tong fingers are locked in the closed position by the float. A significant drop in the level of the cooling liquid contained in the reactor vessel leads to the lowering of the float, so that the tong fingers are released and the absorbing member automatically drops by gravity into the reactor core.

According to a first embodiment of the invention, each of the tong fingers comprises a cam surface facing a cam surface formed on the float, a locking member being placed between each of the cam surfaces formed on the tong fingers and the cam surface formed on the float.

Preferably, in order that the movement of the float takes place with minimum frictioin, the locking members are balls.

According to a first constructional variant of the invention, the balls are non-floating and are placed between a lower abutment formed on the float and an upper abutment associated with the supporting member.

The tong fingers can then be fixed to the supporting member and comprise an elastic part radially deformable with respect to a vertical axis of the supporting member, the upper abutment being formed on each of the fingers.

In a particularly advantageous variant, because it permits the rearming of the apparatus following the dropping of the absorbing member, the tong fingers are mounted on a part able to slide vertically between a lower normal operation position and an upper rearming position with respect to the supporting member, each of the fingers having an elastic part radially deformable with respect to a vertical axis of the supporting member and elastic means are placed between the supporting member and said part so as to place the latter in the lower normal operation position.

The balls forming the locking members can also be floating balls inserted between a lower abutment and an upper abutment formed on each of the fingers.

In an advantageous embodiment, the upper end of the float is extended by a receptacle making it possible to trap liquid in the case of a level drop, said liquid adding its weight to that of the float to facilitate the lowering thereof.

In a second embodiment of the invention, the actual float constitutes a locking member placed between the facing cam surfaces formed on the tong fingers. Thus, there are at least two floats in the form of balls, each of the balls being placed between a lower abutment formed on each of the fingers and an upper abutment associated with the supporting member.

According to another feature of the invention, the dropping of the absorbing member can also be brought about by a mechanical control member mounted on the supporting member, so that it can slide vertically with respect thereto, said control member bearing on the float, so that its downward displacement has the effect of bringing the float into the bottom position.

Such a control member can be used for controlling the drop of the absorbing member, a drop control mechanism then controlling the displacement of the control member, e.g. under the action of a biplate sensitive to the temperature prevailing in the vessel.

In order to automatically control the drop of the absorbing member when the pressure prevailing in the vessel exceeds a maximum given pressure, the displacement of the control member can also be controlled by a device sensitive to the pressure prevailing in the vessel.

As a variant, the automatic drop of the absorbing member when the pressure in the vessel exceeds a maximum given pressure is obtained by providing on each float at least one part able to tear away under the threshold pressure conditions.

Finally, according to a particularly advantageous embodiment because it permits the reuse of the apparatus following the drop of the absorbing member, said same result is obtained by equipping the lower end of the float with a deformable diaphragm occupying a lower position or an upper position, depending on whether the pressure in the vessel is below or above a given maximum pressure. This diaphragm is centrally fixed to a part able to slide vertically with respect to the supporting member, said part bearing against a top abutment of the supporting member when the float is in the raised position. Under the effect of an increase in the pressure to above the maximum permitted pressure, the diaphragm then assumes its raised position, which has the effect of drawing the float downwards because the centre of the diaphragm is fixed to a part, which bears against a top abutment and which cannot therefore move downwards. The lowering of the float leads to the unlocking of the tongs and makes it possible for the absorbing member to drop, in the same way as with a drop of the cooling liquid level in the reactor vessel.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENT

Figure 1:
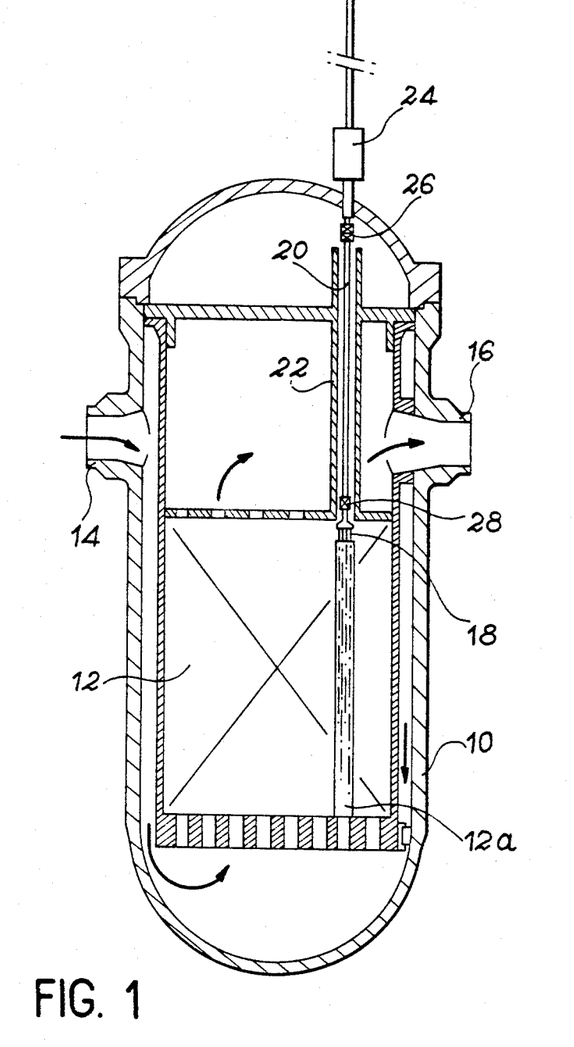
FIG. 1, an elevation and sectional view very diagrammatically showing a pressurized water nuclear reactor which can be equipped with apparatuses according to the invention.

FIG. 1 very diagrammatically shows a pressurized water nuclear reactor. In known manner, this reactor comprises a vertically axed cylindrical vessel 10, within which is placed the reactor core 12, constituted by the juxtaposing of nuclear fuel assemblies such as 12a. Vessel 12 is equipped with an inlet tube 14 and an outlet tube 16 arranged in such a way that the pressurized water constituting the cooling liquid of such a reactor circulates from bottom to top in core 12.

The fission reaction occurring in the reactor core 12 is controlled by introducing control rods or clusters 18 into the latter and these form the neutron absorbing members. Each of the control rods 18 can in particular be constituted by a bundle of absorbing rods which can slide vertically in guide tubes provided for this purpose in certain of the nuclear fuel assemblies 12a forming the reactor core 12.

The upper end of each of the controls rods 18 is suspended on the lower end of a vertical bar 20. The guiding of each of the control rod 18 - control bar 20 assemblies is ensured above core 12 by vertical guide tubes 22.

Each of the control bars 20 is suspended by its upper end on a control mechanism 24 placed above the dome of vessel 10 and making it possible to control the vertical displacement of rods 18, thus controlling the reactor.

In known manner, the control bars 20 are suspended on mechanisms 24 via electromagnetic coupling devices 26. When a reactor scram is required, the electric power supply to devices 26 stops, which has the effect of permitting the drop of the assemblies constituted by the control bars 20 and the control rods 18. Thus, the latter are completely introduced into core 12, which has the effect of stopping the fission reaction.

According to the invention, to this possibility of dropping the control rods by stopping the electric power supply for the electromagnetic devices 26 is added or substituted the possibility linked with the apparatuses 28 by which the upper end of each of the control rods 18 is suspended on the lower end of each of the control bars 20.

These apparatuses 28 serve to increase the security of the reactor. As will be shown hereafter, they make it possible to bring about the automatic drop of the control rods 18 into the reactor core 12 under the conditions requiring a reactor scram.

These special conditions requiring reactor scram are in particular an important drop in the water level in the reactor vessel 10 and, usually but not necessarily, exceeding the maximum permitted operating pressure within vessel 10.

Figure 2:
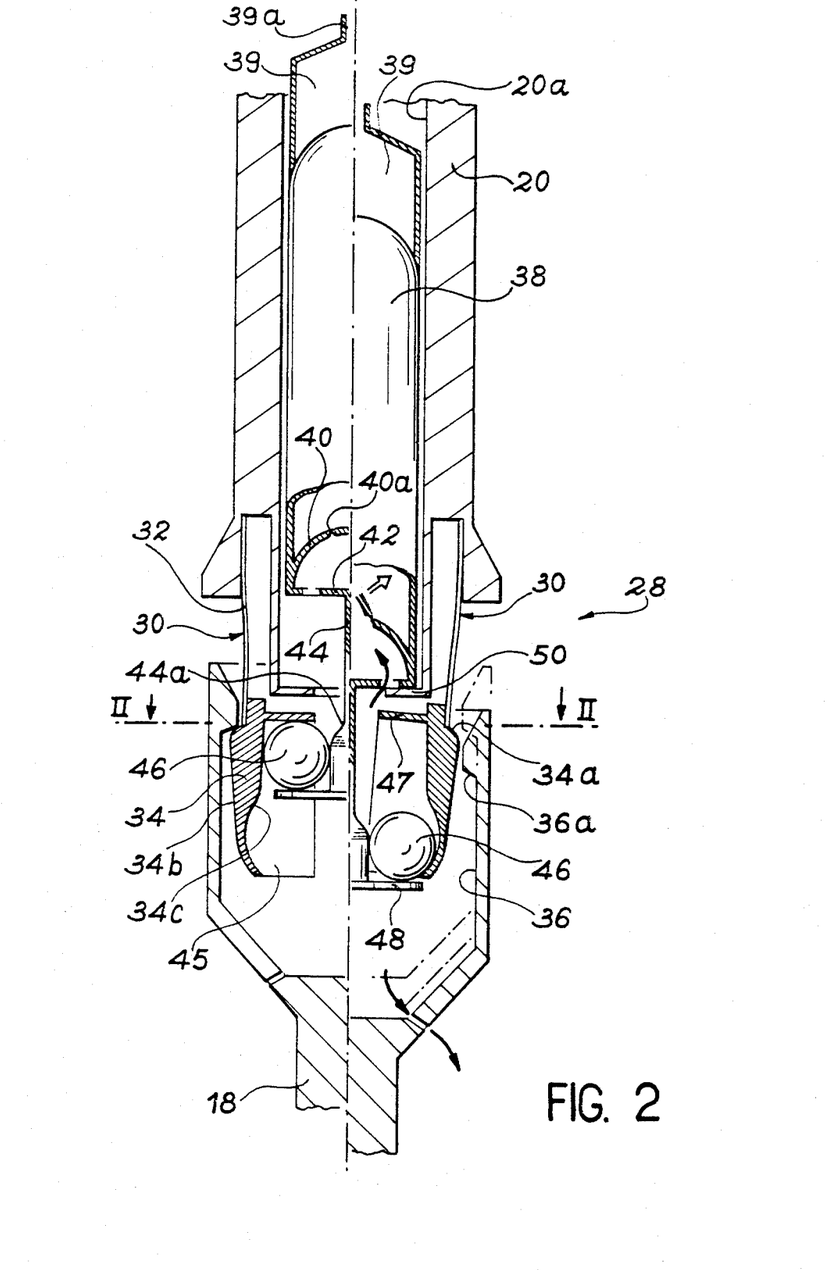
FIG. 2, a larger scale, longitudinal sectional view showing the link between an absorbing member and its control bar using an apparatus according to the invention in the reactor of FIG. 1 and more specifically illustrating a first embodiment of the invention, whereby the left-hand half of the drawing shows the apparatus in the position which it normally occupies when the absorbing member is suspended on its bar, whereas the right-hand half shows how a drop in the cooling liquid level or an increase in the pressure leads to the dropping of the absorbing member.

A first embodiment of one of the apparatuses 28 will be described in detail with reference to FIGS. 2 and 3. As shown in FIG. 2, apparatus 28 comprises a gripper or tongs formed from at least two fingers 30 (3 in the embodiment shown if FIG. 3) mounted at the lower end of the control bar 20. Fingers 30 are identical and are circumferentially distributed about the vertical axis of bar 20. In addition, they are oriented substantially parallel to said axis and project downwards from the lower end of bar 20.

In the embodiment shown in FIG. 2, each of the fingers 30 has a part 32 constituted by a plate which is radially flexible with respect to the vertical axis of bar 20. The upper end of flexible part 32 is fixed to the lower end of control bar 20.

At its lower end, each of the flexible parts 32 supports a gripping member 34. The outer face of member 34 is provided at its upper end with a rounded shoulder 34a, which can be located beneath a shoulder 36a formed at the upper end of a central recess 36 in the head of the corresponding control rod 18. Below shoulder 34a, the outer surface of each of the parts 34 is slightly downwardly tapered at 34b, as shown in FIG. 2.

On its inner face, each of the gripping members 34 defines a cam surface 34c, which is such that the distance separating it from the vertical axis of the control bar 20 increases from top to bottom over most of the height of member 34. More specifically, in its upper part, surface 34c is substantially parallel to said vertical axis, whereas it widens out in its lower part, which in cross section is shaped like a circular arc.

Figure 3:
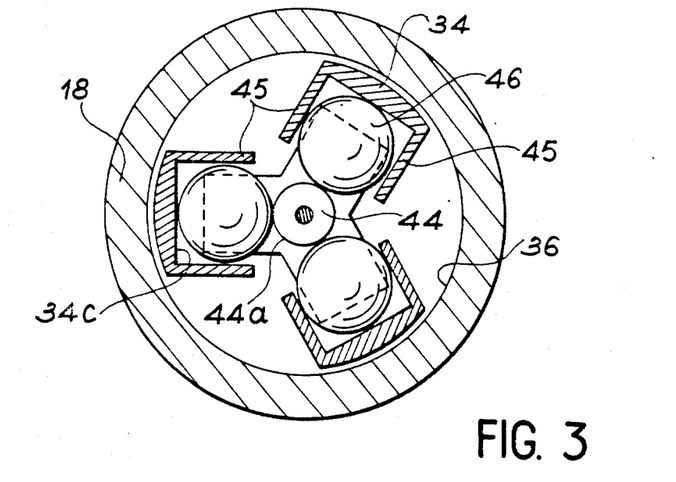
FIG. 3, a sectional view along line II—II of FIG. 2.

In the embodiment shown in FIGS. 2 and 3, apparatus 28 according to the invention also has a hollow cylindrical float 38, received in a cylindrical recess 20a formed on the lower end of control bar 20, in accordance with the vertical axis of the latter.

Float 38 comprises two flat or hemispherical plates. In the latter case, the upper plate is convex, whereas the lower plate 40 is concave. Above the upper plate is fixed a receptacle 39 able to trap the cooling liquid. This receptacle is therefore provided with an upper orifice 39a. Below the lower concave plate 40, float 38 has a horizontal perforated plate 42. A vertical bar 44 with a circular cross-section is attached to the centre of plate 42 and projects downwards between the tong fingers 30. Bar 44 has an upper small diameter part and a lower larger diameter part, the diameter of the bar increasing progressively between these two parts. The outer surface 44a of bar 44 consequently defines a cam surface 44a, whereby said surface can be cylindrical or planar.

In the embodiment shown in FIG. 2, non-floating balls like steel balls 46 are placed between each of the gripping members 34 and bar 44, so as to roll on the facing cam surfaces 34c and 44a formed on these elements.

As is more specifically illustrated in FIG. 3, each of the balls 46 is laterally held between two parallel vertical partitions 45 and formed on the corresponding member 34, so as to project on either side of ball 46 from cam surface 34b.

Moreover, each of the balls 46 is maintained in the vertical axis of control bar 20 between a lower abutment formed by a horizontal plate 48 fixed to the lower end of bar 44 and an upper abutment formed by a horizontal partition 47 formed in the corresponding member 34 and connecting the partitions 45 at their upper end.

Finally, the cylindrical recess 20a in which is received the float 38 is terminated at its lower end by a horizontal plate 50 forming an abutment and which centrally traverses bar 44.

Under normal operating conditions, float 38 is placed below the water level in the reactor vessel. As the float 38 is filled with a lower density fluid such as argon, it is then located in an upper position in which it engages the balls 46 against partitions 47 by means of plate 48.

In said upper position, shown in the left-hand half of FIG. 2, balls 46 are forced radially towards the outside by a lower larger diameter part of bar 44. In view of the flexibility of part 32 of each of the fingers 30, the gripping members 34 are naturally forced radially towards the outside, so that shoulders 34a are blocked below shoulder 36a and absorbing member 18 remains attached to the control bar 20.

When the water level in the reactor vessel drops below a threshold value for which the floats 38 are still submerged, the latter automatically drop until they bear against plate 50, as illustrated in the right-hand half of FIG. 2. This drop is facilitated by the cooling liquid trapped in receptacle 39. In view of the fact that balls 46 do not float, they drop by rolling with the float 38 and bear on plate 48.

Balls 46 are then level with the lower widened part of the cam surfaces 34c formed within each of the gripping members 34. Therefore the outward radial force exerted previously by the balls on fingers 30 is released. In view of the flexibility of finger parts 32, the rounded nature of shoulder 34 and the chamfer of shoulder 36a, the absorbing member 18 then drops by gravity, as can be seen in the right-hand half of FIG. 2.

Preferably and as is also shown in FIG. 2, the apparatus according to the invention is also designed to automatically initiate the drop of absorbing member 18 when the pressure within the reactor vessel exceeds a given threshold.

In the embodiment shown in FIG. 2, this result is obtained by providing on the convex hemispherical base 40 of float 38 parts 40a having a reduced resistance and which are e.g. formed by notches machined into said base.

As is shown in the right-hand half of FIG. 2, an increase in the pressure to beyond the resistance threshold of these notches 40a leads to the base 40 bursting. Water then enters float 38, which has the effect of lowering the same and has the same consequences as those described when the lowering of the float results from a drop in the water level in the reactor vessel.

Figure 4:
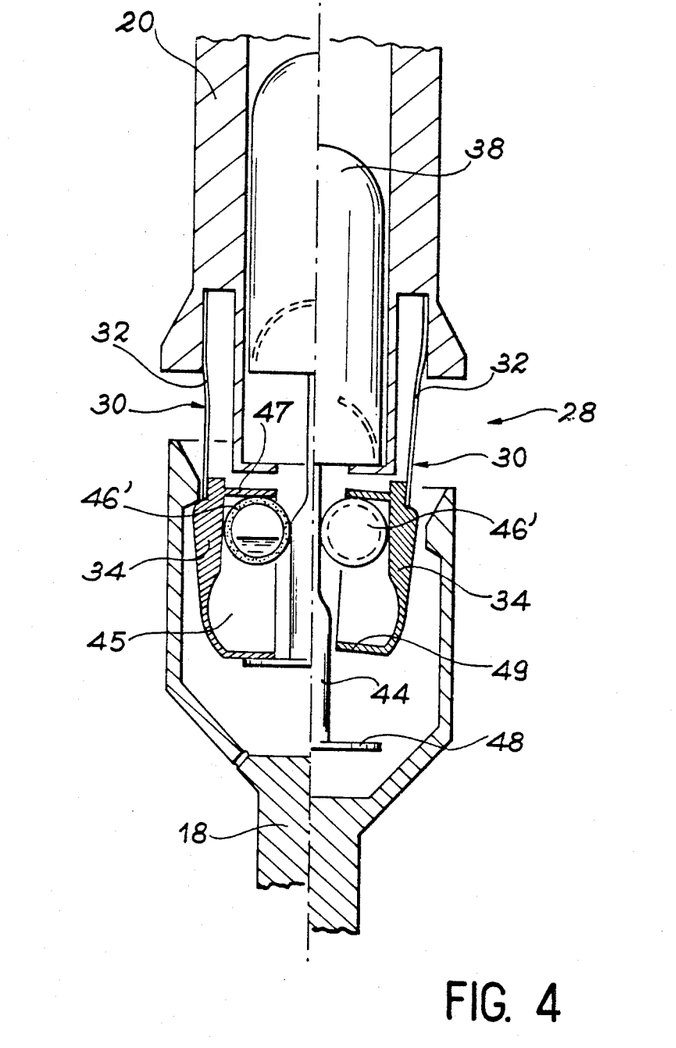
FIG. 4, a view comparable to FIG. 2 illustrating a variant of the embodiment shown in the latter.

FIG. 4 shows a constructional variant of the apparatus 28 according to the invention, which only differs from the embodiment described with reference to FIGS. 2 and 3 through the construction of the balls used for locking the tongs when the reactor is operating normally.

More specifically, in the embodiment of FIG. 4, between bar 44 of float 38 and each of the gripping members 34 of fingers 30, is placed a floating ball 46', which permanently bears against the upper partition 47 of the corresponding member 34.

In this case, each of the members 34 also comprises a horizontal lower partition 49 connecting side walls 45 at their lower ends. The plate 48 fixed to the lower end of the float bar 44 is then positioned below said lower partition 49.

Thus, under the normal operating conditions shown in the left-hand half of FIG. 4, the upper position of float 38 is determined by the bearing of plate 48 against the lower partitions 49 of each of the fingers. In this position, balls 46' are positioned level with the lower large diameter part of bar 44, which has the effect of radially outwardly deforming the flexible portions 32 of each of the fingers 30. The tongs formed by these fingers are consequently locked in the closed or gripping position in which the absorbing member 18 is suspended on control bar 20.

As illustrated by the right-hand half of FIG. 4, a lowering of float 38 can here result either from a drop in the water level within the reactor vessel, or by a rise in the pressure within said vessel to beyond a maximum permitted threshold, so that balls 46', which remain at the same level, are made to face the upper small diameter part of bar 44. Therefore, the radial force towards the outside previously exerted on fingers 30 through balls 46' is released, so that the automatic fall by gravity of absorbing member 18 is initiated.

It has hitherto been seen that the operation of the apparatus on exceeding the maximum operating pressure leads to the bursting of the base of float 38. However, this solution is not entirely satisfactory, because it is then necessary to replace the float when a release has taken place.

Figures 5, 9:
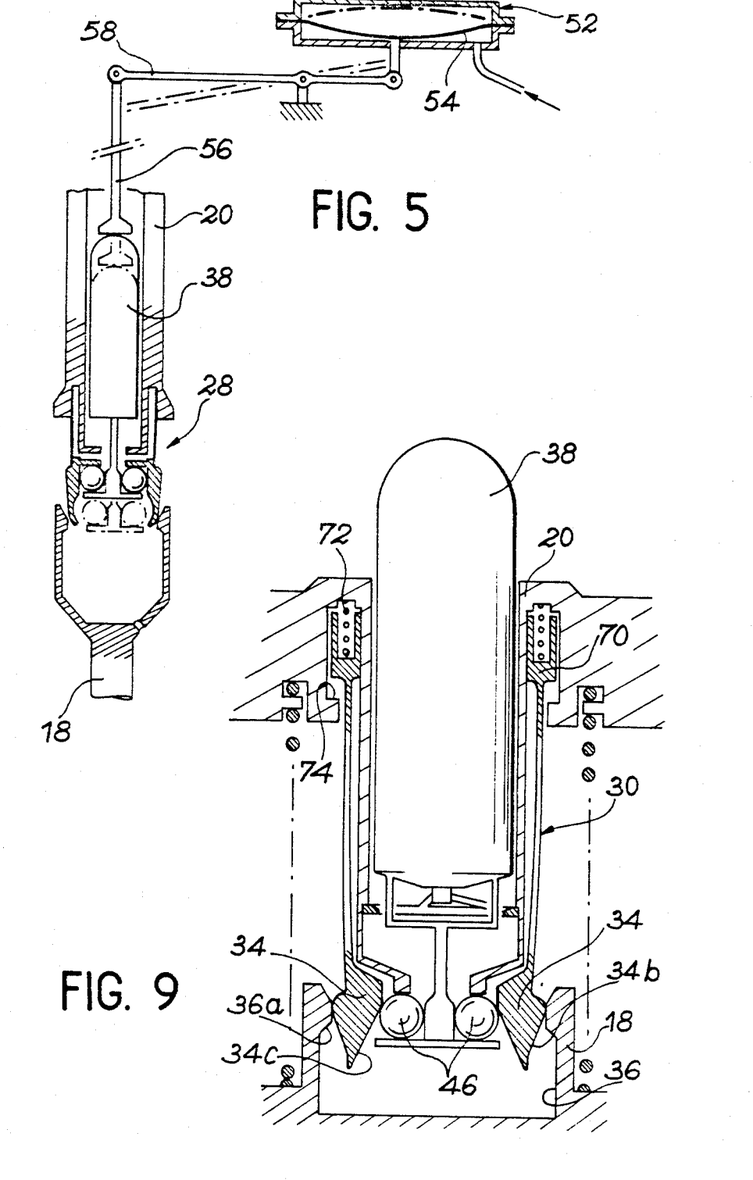
FIG. 5, a partial longitudinal sectional view illustrating another variant of the embodiment of FIGS. 2 and 4.
FIG. 9, a view comparable to FIG. 8, illustrating the rearming of the apparatus of FIG. 6 in the presence of cooling liquid in the reactor vessel.

FIG. 5 diagrammatically shows a variant of the embodiment described relative to FIGS. 2 and 3 making it possible to obviate this disadvantage.

As shown in FIG. 5, apparatus 28 is then produced in exactly the same way as the apparatus shown in FIGS. 2 and 3, with the sole difference that float 38 comprises no part designed to burst when the pressure in the reactor vessel exceeds the maximum permitted pressure.

However, use is made of an ancillary device 52 having a tight diaphragm 54 able to occupy two positions depending on whether the pressure in the vessel is below or above a given value. For this purpose, one of the faces of diaphragm 54 (the lower face in FIG. 5) is subject to the pressure prevailing within the vessel. This result can be obtained either by placing device 52 directly in the reactor vessel, or by linking the lower face of the diaphragm with the vessel by means of an appropriate duct.

Under normal pressure conditions, i.e. when the pressure is below the permitted threshold, diaphragm 54 occupies the low position shown in continuous line form in FIG. 5. However, when the pressure exceeds this threshold, diaphragm 54 tilts and assumes the upper position shown in broken line form in FIG. 5.

By connecting by a linkage 58 the centre of diaphragm 54 to a plunger 56 located within the control bar 20, so as to be in contact with the upper plate of float 38, the tilting of diaphragm 54 under the action of an inadmissible pressure increase in the vessel can lead to the float 38 being forced downwards, as shown in broken line form in FIG. 5. Thus, the drop of the absorbing member 18 is automatically initiated in the manner described hereinbefore. Obviously, a single device 52 can be used for simultaneously controlling several absorbing members 18.

The principle described hereinbefore with reference to FIG. 5 is used in another variant of the embodiment of FIG. 1, which will now be described relative to FIGS. 6 to 9. This variant has the advantage of permitting the rearming of the device following the security drop of the absorbing members, which was not the case in the previously described embodiments.

Figure 6:
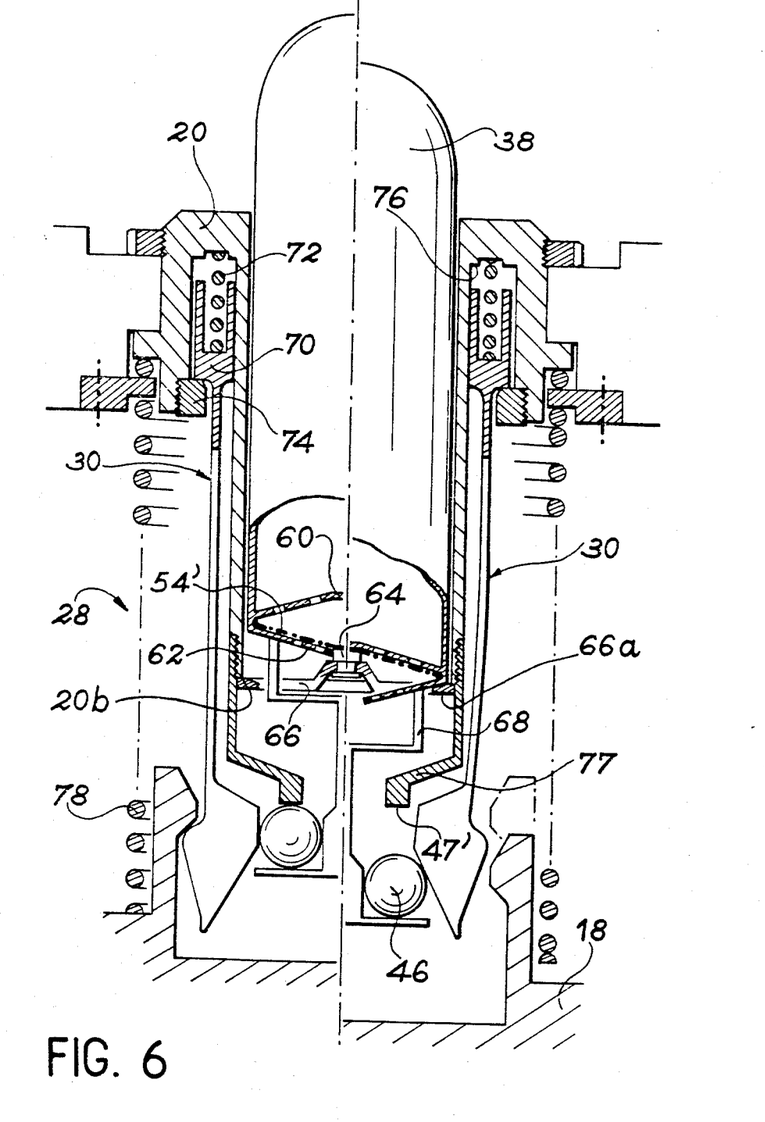
FIG. 6, a view comparable to FIGS. 2 and 4 illustrating another variant of the embodiment of FIGS. 2 and 4.

As is more particularly illustrated by FIG. 6, a tight diaphragm 54' able to occupy two positions is in this case directly integrated into the lower plate of float 38.

More specifically, diaphragm 54' is peripherally gripped between a perforated upper conical plate 60 and a perforated lower conical plate 62. The conicity of these plates 60, 62 is oppositely directed, so as to permit the travel of diaphragm 54' between a lower position corresponding to the normal operating conditions and an upper position corresponding to a rise in the pressure within the reactor vessel to beyond the maximum permitted threshold.

Figure 7:
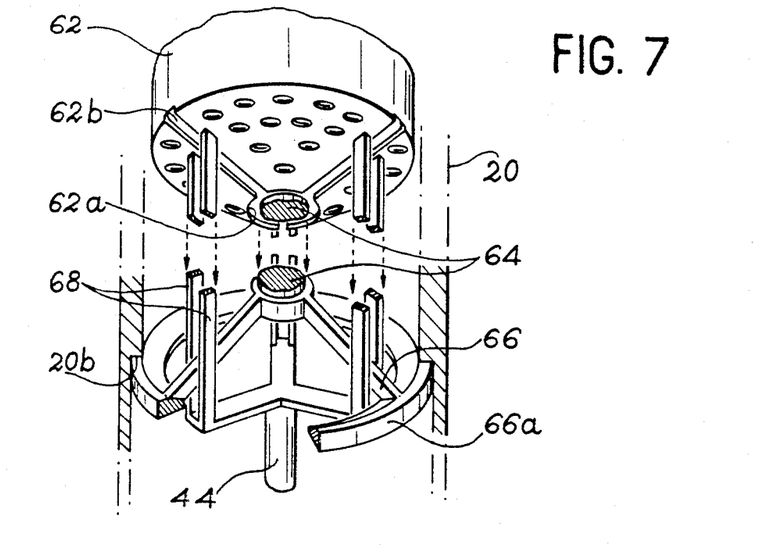
FIG. 7, an exploded perspective view in part sectional form showing part of the apparatus of FIG. 6.

A stud 64 is fixed in the centre of diaphragm 54', so as to project downwards through a central passage 62a formed in lower plate 62 and as can better be seen in FIG. 7. Stud 64 supports a star-shaped part 66, which is peripherally provided with a ring 66a, which normally bears against a shoulder 20b formed on control bar 20 when diaphragm 54' is in the lower position, as illustrated in the left-hand half of FIG. 6. Shoulder 20b is positioned above the peripheral ring 66a of part 66, so that it prevents the rise of the latter.

As is more specifically illustrated by FIG. 7, in order to permit the drop of float 38, the lower plate 62 also has radial slots 62b issuing into the central opening 62a and located above each of the arms of part 66.

To take account of the presence between the base or plate of float 38 and bar 44 of part 66, bar 44 is fixed to the lower plate 62 by vertical rods 68, as best can be seen in FIG. 7. It is also possible to see in the latter that the vertical rods 68 also guide part 66, in order that each of its arms remains facing the radial slots 62b.

In order to permit the rearming of the apparatus in the embodiment of FIG. 6, the tong fingers 30 are no longer directly fixed to the lower end of control bar 20 and are instead mounted thereon so as to be able to vertically slide by a certain height. To this end, fingers 30 are fixed by their upper end to a ring 70 surrounding control bar 20. Ring 70 is engaged against a bottom abutment 74 of bar 20 by a compression spring 72. A top abutment 76 on which also bears spring 72 limits the upward displacement of ring 70.

Bearing in mind the mobility of the tongs in a vertical direction, the top abutment against which the balls 46 normally bear (left-hand half of FIG. 6) is now not formed on fingers 30, but on a tubular part 77 fixed to the lower end of control bar 20. This abutment, constituted by the lower end of part 77, is designated by reference 47' in FIG. 6.

The release of apparatus 28 shown in FIGS. 6 and 7 is identical to that described hereinbefore with reference to FIGS. 2 and 3 in the case of a drop in the water level contained in the reactor vessel.

When the pressure within the vessel exceeds the maximum permitted threshold, diaphragm 54' deforms and assumes its upper position in which it is engaged against wall 60. In view of the fact that the peripheral ring of part 66 bears against the abutment 20b of control bar 20, said deformation does not have the effect of raising part 66 and instead lowers float 38, as is shown in the right-hand part of FIG. 6. Thus, the conditions are the same as described hereinbefore leading to the unlocking of the tongs formed by finger 30 and consequently the gravity fall of the absorbing member 18 into the reactor core.

FIG. 6 also shows a variant in which the detachment of the absorbing member 18 is assisted by the presence of a compression spring 78 fixed to the control bar 20 and normally compressed between the lower end of said bar and the upper end of the absorbing member 18.

As a result of the possibility of an upward displacement of the tongs with fingers 30 and ring 70, the rearming of the apparatus becomes possible under whatever conditions it happens to be.

Figure 8:
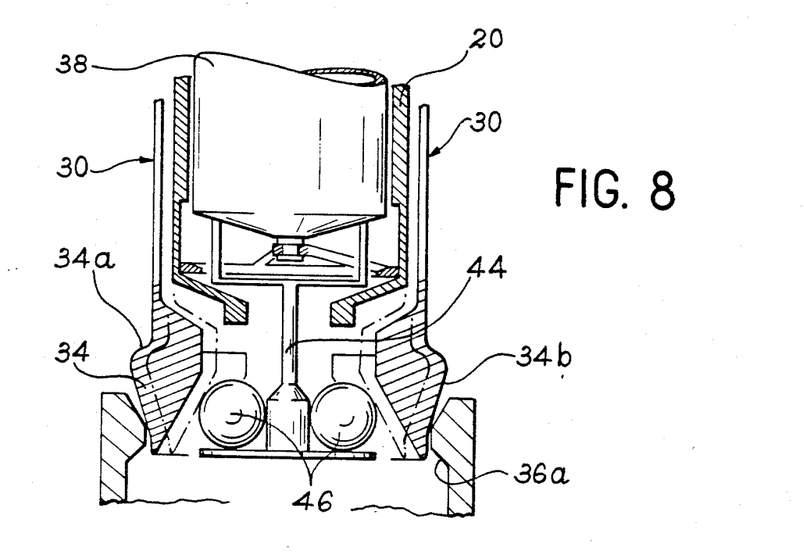
FIG. 8, a view illustrating the rearming of the apparatus of FIG. 6 in the absence of cooling liquid in the reactor vessel.

Thus, FIG. 8 shows the positions occupied by the different elements of the apparatus of FIG. 6 following the dropping of the absorbing member, the water having been removed from the reactor vessel. Under these conditions, float 38 is in the bottom position, so that no radial force is exerted by the central bar 44 on fingers 30 via balls 46. There is even a certain clearance enabling fingers 30 to radially inwardly deform, as shown in broken line form in FIG. 8. This deformation comes into effect when the control bar 20 is lowered until the outer tapered surfaces 34b of the gripping members 34 bear on the chamfer 36a made on the upper end of recess 36 formed in the head of absorbing member 18.

Bearing in mind the clearance between the gripping members 34 and balls 46, the continuation of the drop of control bar 20 has the effect of radially inwardly deforming fingers 30 to the position shown in mixed line form in FIG. 8. Shoulder 36a formed on the head of the absorbing member can thus be cleared. The radial flexibility of fingers 30 then has the effect of bringing them into the position shown in continuous line form in FIG. 8, so that the shoulders 34a are located below shoulder 36a.

In order that the rise of the absorbing member cannot take place, the reactor vessel must again be filled with water in order that float 38 again rises within control bar 20, so as to bring balls 46 into the upper position ensuring the locking of fingers 30 in the closed position of the tongs. The raising of the absorbing member can then be carried out with the aid of the control mechanism 24 (FIG. 1) associated therewith.

FIG. 9 shows that rearming is also possible when the vessel is filled with water using the device described hereinbefore with reference to FIGS. 6 and 7. In this case and shown in FIG. 9, float 38 is in the top position, so that the balls 46 are also in the top position and normally lock the tongs in the closed or gripping position.

Thus, on lowering the control bar 20, as hereinbefore, the lower tapered part of the gripping members 34 are brought into contact with the chamfer at the upper end of the recess formed in the head of the absorbing member 18. However, balls 46 are then located in a position such that they lock the tongs and consequently prevent the radial inward deformation of fingers 30.

As specifically illustrated by FIG. 9, the continuation of the downward travel of control bar 20 then has the effect of raising the tongs constituted by the annular part 70 and fingers 30 by compressing spring 72. The upward travel of the tongs is such that it makes it possible to bring the lower portions of the cam surfaces 34c formed on the gripping members 34 level with balls 46. As these lower portions are further from the vertical axis of the control bar than the upper portions of the cam surfaces 34c, the force exerted radially outwards by balls 46 on fingers 30 is released. The fingers 30 even have an adequate inward travel to enable them to clear shoulder 36a.

As soon as clearing has taken place, spring 72 is extended again, so as to bring the annular part 70 into engagement with shoulder 74 of control bar 20. Thus, the device is rearmed and the absorbing member 18 can be raised with the aid of control mechanism 24 (FIG. 1) associated therewith.

Figure 10:
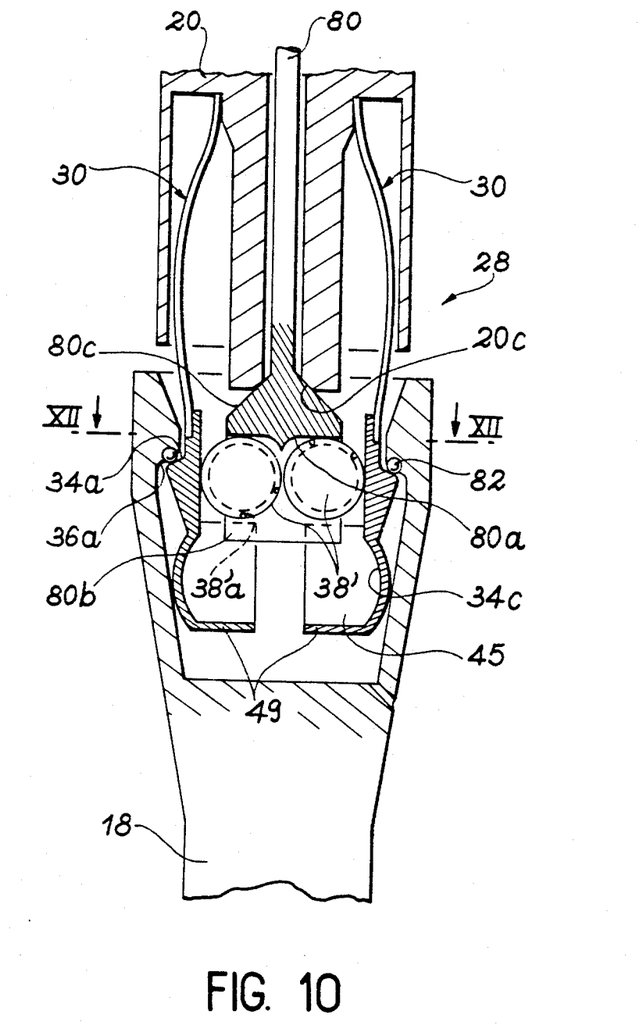
FIG. 10, a view comparable to FIGS. 2, 4 and 6 illustrating a second embodiment of the invention.
Figure 11:
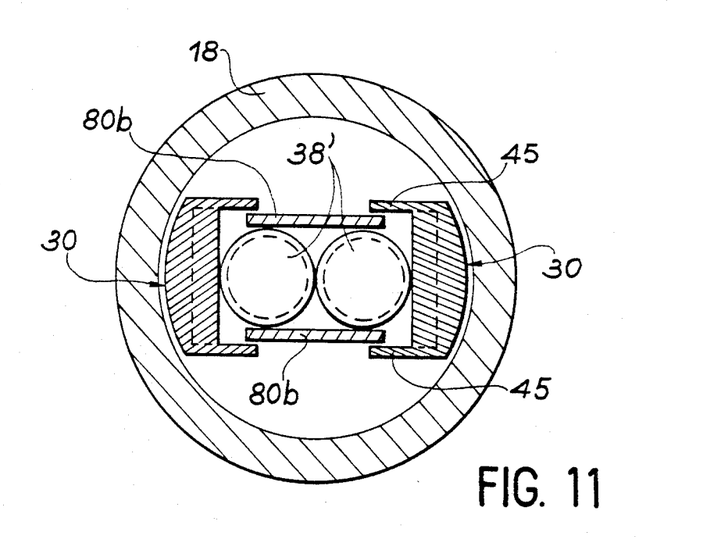
FIG. 11, A sectional view along line XII—XII of FIG. 10.

In FIGS. 10 and 11 is shown a second embodiment of apparatus 28 according to the invention. In this embodiment, balls 38' ensuring the locking of the tongs in the closed or gripping position also constitute the floats ensuring the release of the apparatus and the opening of the tong when the water level in the reactor vessel drops below the permitted lower level.

In the embodiment of FIGS. 10 and 11, apparatus 28 comprises tongs here constituted by two fingers 30 fixed to the lower end of control bar 20. Fingers 30 are constructed in essentially the same way as in the first embodiment. However, as shown in FIG. 10, upper partition 47 is eliminated, the floating balls 38' bearing against a top abutment 80a formed at the lower end of a vertical bar 80 slidingly mounted along the axis of control bar 20.

The embodiment of FIGS. 10 and 11 differs from the first embodiment also through the fact that the float 38 is eliminated, so is its bar 44. The two floats 38' in the form of balls, which are in contact with the cam surfaces 34c formed within fingers 30 consequently directly bear against one another.

In the embodiment of FIGS. 10 and 11, balls 38' are laterally secured by means of two vertical, parallel partitions 80b, which slide within the partitions 45 formed on fingers 30.

As illustrated in FIG. 10, when the water level in the reactor vessel is normal, the floating balls 38' occupy a raised position in which they engage against the top abutment 80a. Therefore the latter also occupies a top position in which a conical bearing surface 80c bears against a conical bearing surface 20c formed at the lower end of control bar 20. The balls 38' are then level with the upper part of cam surfaces 34c formed within the tong fingers 30. Under these conditions, the tongs are locked in the closed or gripping position.

However, if the water level within the reactor vessel drops below the level occupied by the floating balls 38' the latter also drop to bear against the lower partitions 49 of the tong fingers. Under these conditions, the balls 38' bear against the lower part of cam surfaces 34c. The distance separating these cam surfaces from the vertical axis of control bar 20 is greater level with said lower part than level with the upper part, so that the locking of the tongs is automatically released and the absorbing member 18 is disengaged under the effect of its own weight.

In the embodiment of FIG. 10, this detachment is facilitated by the fact that the contact between shoulders 36a and 34a takes place by means of rolling balls 82.

As in the embodiment of FIG. 2, apparatus 28 of FIGS. 10 and 11 can also be released when the pressure in the reactor vessel exceeds a permitted limit. To this end, it is possible to provide in the wall of each of the balls 38', a reduced resistance portion 38'a, e.g. formed by a groove made in said wall.

An identical release can also be brought about through a device of the type described hereinbefore with reference to FIG. 5, said device moving the balls 38' downwards by acting through bar 80.

As a variant, it should be noted that bar 80 can also be used for controlling the initiation of the drop of absorbing member 18 with the aid of any other not shown external device, such as a biplate sensitive to the temperature in the vessel.

Obviously, the invention is not limited to the embodiments described in exemplified manner hereinbefore and covers all possible variants and combinations.

From this standpoint, it is pointed out that although the apparatus according to the invention is designed for positioning between each of the control bars 20 and the corresponding absorbing member 18, it could also be placed at any other point downstream of the control mechanism 24 and can in particular be used in place of the electromagnetic device 26.

In a comparable manner, the application of the apparatus according to the invention is not limited to a pressurized water nuclear reactor and can be considered in nuclear reactors of any other type.

With regards to the structure of the actual apparatus, the tong fingers need not have a flexible part in a radial direction, but can be mounted at the lower end of the control member supporting them, so that they can move freely in a radial direction.

Moreover, although the locking of the tong fingers by means of members in the form of balls is more particularly advantageous because it aids the release of the apparatus by reducing friction, it is clear that the use of balls is not limitative and that locking members such as rollers could also be used. In a more general manner, if it is possible to accept a very small friction, it is also possible to replace the balls by a single member having a quasi-punctiform contact with each of the cams surfaces formed on the tong fingers.

Moreover, in each of the embodiments, it is possible to provide a central bar bearing on the float and controlled by a random external mechanism, in order to ensure the release of the apparatus under conditions other than those for which it was specifically designed.

Finally, although all the embodiments described comprise a gripper or tongs, whose gripping takes place by a radial moving apart of the fingers, a reverse arrangement could be used. In this case, locking takes place by means of a tubular member sliding about the control bar 20 and which normally covers the fingers of the tongs. This member can be a float or can support ancillary locking members, such as balls.

What is claimed is:

1. In a nuclear reactor apparatus having a reactor core disposed in a reactor vessel, a cooling liquid filling said vessel to a predetermined level, a neutron absorbing member for insertion into said core, a support means connected to said neutron absorbing member for supporting said neutron absorbing member above said core, an apparatus for automatically initiating the drop of said neutron absorbing member into said core of said nuclear reactor, when the level of said cooling liquid circulating in said vessel containing said reactor core drops below a given minimum level, the said absorbing member normally being suspended on said support means, wherein said apparatus comprises a tongs with at least two fingers, mounted on a supporting member and by which said neutron absorbing member is suspended on the supporting member, said tongs being able to occupy a closed position and an open position; and at least one floating member able to float on said cooling liquid, said floating member being retained and carried by said supporting member, so as to be able to move vertically between a raised position when the floating member is below the said given minimum liquid level, and a lowered position when the floating member is above the said given minimum liquid level, said at least one floating member comprising at least one part able to tear away when the pressure in the vessel exceeds a maximum given pressure so as to allow said floating member to move to the lowered position; and cam means provided between the floating member and said fingers, said cam means locking the tongs in the closed position when the floating member is in the raised position and allowing the opening of the tongs when the floating member is in the lowered position.

2. An apparatus according to claim 1, wherein the locking members are non-floating balls inserted between a lower abutment formed on the floating member and an upper abutment associated with the supporting member.

3. An apparatus according to claim 1, wherein the tong fingers are fixed to the supporting member and have an elastic portion radially deformable with respect to a vertical axis of the supporting member, said upper abutment being formed on each of the fingers.

4. An apparatus according to claim 2, wherein the tong fingers are mounted on a part able to slide vertically between a lower normal operation position and an upper rearming position with respect to the supporting member, each of the fingers having an elastic portion radially deformable with respect to a vertical axis of the supporting member, elastic means being placed between the supporting member and said part in order to bring the latter into the lower normal operation position.

5. An apparatus according to claim 1, wherein the locking members are floating balls placed between a lower abutment and an upper abutment formed on each of the fingers.

6. An apparatus according to claim 1, wherein the floating member constitutes a locking member placed between facing cam surfaces formed on the tong fingers.

7. An apparatus according to claim 6, wherein each floating member is a ball placed between a lower abutment formed on each of the fingers and an upper abutment associated with the supporting member.

8. An apparatus according to claim 1, wherein a mechanical control member is mounted on the supporting member so as to slide vertically with respect to the latter, said control member bearing on the floating member in such a way that its downward displacement brings the floating member into the bottom position.

9. An apparatus according to claim 8, wherein the displacement of the control member is controlled by a device sensitive to the pressure prevailing in the vessel to control the downward displacement of said control member when the pressure exceeds a maximum given pressure.

10. An apparatus according to claim 6 wherein a receptacle able to trap a given volume of cooling liquid by an upper opening, is provided at the upper end of the floating member.

11. An apparatus according to claim 1, wherein a control mechanism is connected to an upper end of said mechanical control member to control the displacement of the latter.

12. An apparatus according to claim 2, wherein the floating member comprises a deformable diaphragm forming its lower end and occupying a lower position or an upper position, as a function of whether the pressure in the vessel is below or above a maximum given pressure, the diaphragm being centrally fixed to a part able to slide vertically with respect to the supporting member, said part bearing against a top abutment of the supporting member when the floating member is in the upper position.

* * * * *